United States Patent [19]
Davoust

[11] Patent Number: 5,550,964
[45] Date of Patent: Aug. 27, 1996

[54] SYSTEM AND METHODS FOR INTELLIGENT ANALYTICAL GRAPHING

[75] Inventor: Paul Davoust, Mountain View, Calif.

[73] Assignee: Borland International, Inc., Scotts Valley, Calif.

[21] Appl. No.: 333,000

[22] Filed: Nov. 1, 1994

Related U.S. Application Data

[63] Continuation of Ser. No. 993,195, Dec. 18, 1992, Pat. No. 5,375,201.

[51] Int. Cl.⁶ .................................................. G06F 15/00
[52] U.S. Cl. .................................................. 395/140
[58] Field of Search ................................ 395/140, 133, 395/145, 155, 161; 345/133

[56] References Cited

U.S. PATENT DOCUMENTS 5,182,796  1/1993  Shibagama et al. ................ 395/156
5,278,951  1/1994  Camacho et al. .................. 395/140
5,285,193  2/1994  Iwasaki et al. .................... 345/133

*Primary Examiner*—Phu K. Nguyen
*Attorney, Agent, or Firm*—John A. Smart; David N. Slone

[57] ABSTRACT

An electronic spreadsheet system includes an intelligent analytical graphing module for creating complex analytical graphs from user-supplied information. Methods are described for automatically creating one or more desired analyses on a spread of user-supplied information, all without the user having to modify his or her information or supply (or even understand) the operations necessary for a given analysis. The system includes a preferred interface for receiving selections from the user indicating one or more analyses to be performed on the information, and for displaying analytical graphs for visualizing the result of a selected analysis.

23 Claims, 15 Drawing Sheets

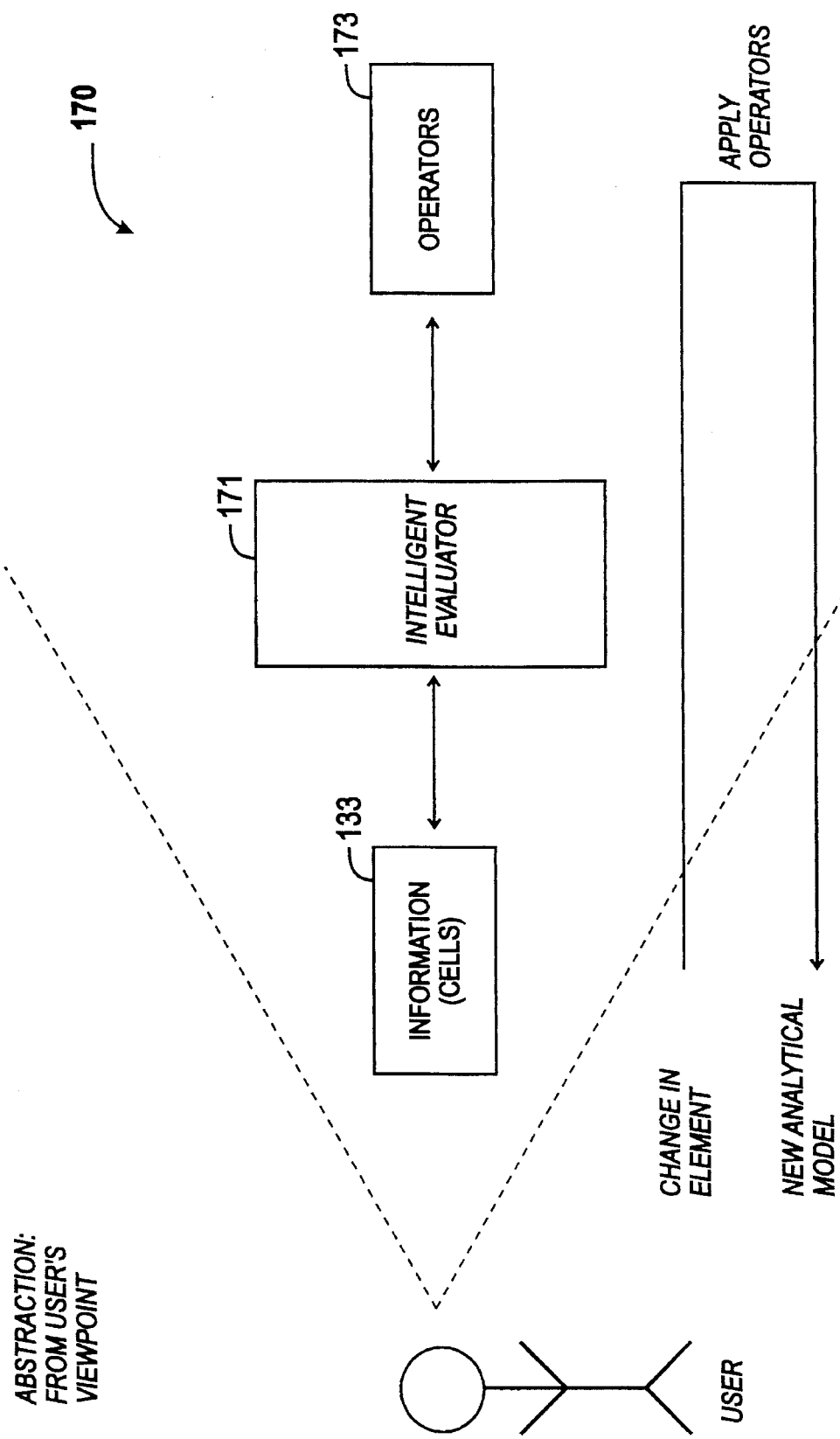

*FIG. 3A*

| | A | B | C | D | E | F | G |
|---|---|---|---|---|---|---|---|
| 1 | | | | | | | |
| 2 | | *MouseStrap Sales* | | | | | |
| 3 | | | | | | | |
| 4 | | Date | Sales | | | | |
| 5 | | 01-May-92 | $98 | | | | |
| 6 | | 02-May-92 | $130 | 310 | | | |
| 7 | | 03-May-92 | $75 | | | | |
| 8 | | 04-May-92 | $100 | | | | |
| 9 | | 05-May-92 | $150 | | | | |
| 10 | | 06-May-92 | $95 | | | | |
| 11 | | 07-May-92 | $50 | | | | |
| 12 | | 08-May-92 | $122 | | | | |
| 13 | | 09-May-92 | $88 | | | | |
| 14 | | 10-May-92 | $106 | | | | |
| 15 | | 11-May-92 | $164 | | | | |
| 16 | | 12-May-92 | $122 | | | | |
| 17 | | 13-May-92 | $95 | | | | |
| 18 | | 14-May-92 | $76 | | | | |
| 19 | | 15-May-92 | $134 | | | | |
| 20 | | 16-May-92 | $55 | | | | |
| 21 | | 17-May-92 | $170 | | | | |
| | | 18-May-92 | $100 | | | | | ized.

SYSTEM AND METHODS FOR INTELLIGENT ANALYTICAL GRAPHING

BACKGROUND OF THE INVENTION

This application is a continuation of the U.S. patent application Ser. No. 07/993,195 filed on Dec. 18, 1992, now U.S. Pat. No. 5,375,201.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

The present invention relates generally to the field of information processing by digital computers and, more particularly, to the processing and presentation of information by program applications, particularly electronic spreadsheets.

Before computers, numerical analyses, particularly financial ones, were usually prepared on an accountant's columnar pad or spreadsheet, with pencil and calculator in hand. By organizing data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerized replacement for the traditional financial modeling tools: the accountant's columnar pad, pencil, and calculator. In some regards, spreadsheet programs are to those tools what wordprocessors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, and a letter to each column. To reference a location at column A and row 1 (i.e., the upper-left hand corner), for example, the user types in "A1". In this manner, the spreadsheet defines an addressable storage location or "cell" at each intersection of a row with a column.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. In this fashion, cell references can serve as variables in an equation, thereby allowing precise mathematical relationships to be defined between cells. The structure and operation of a spreadsheet program, including advanced functions such as functions and macros, are documented in the technical, trade, and patent literature. For an overview, see e.g., Cobb, S., *Using Quattro Pro* 2, Borland-Osborne/McGraw-Hill, 1990; and LeBlond, G. and Cobb, D., *Using* 1–2–3, Que Corp., 1985. The disclosures of each of the foregoing references are hereby incorporated by reference.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what if" scenarios. After a set of mathematical relationships has been entered into a worksheet, the spread of information can be recalculated using different sets of assumptions, with the results of each recalculation appearing almost instantaneously. Performing this operation manually, with paper and pencil, would require recalculating every relationship in the model with each change made.

While electronic spreadsheets offer significant productivity gains in the task of complex data management, none has particularly addressed the task of complex data analysis. For instance, a user may wish to see a weighted moving average of monthly sales figures. With conventional electronic spreadsheets, however, the user must not only understand the complex mathematics behind such a calculation, but also he or she must enter one or more formulas into the spreadsheet for performing the analysis; the likelihood of introducing an error is high. Moreover, this requires the user to modify the underlying spreadsheet with formulas and additional data which themselves are typically not of interest to the user; thus, the approach adds unnecessary complexity to the spreadsheet. Finding conventional approaches unworkable, most users simply forego these analyses—ones which may reveal important trends and characteristics of the user's data.

SUMMARY OF THE INVENTION

Spreadsheet software has found wide application for processing information, particularly financial information. Despite their computational power, however, conventional electronic spreadsheets have paid little attention to the analysis of the information which they store. As a result, valuable analyses, which may reveal important trends and characteristics of the data, have been ignored.

The present invention recognizes a need for providing a spreadsheet system with methods and interface for automating the task of deriving analytical information from one's data and presenting it in easy-to-understand graphical form. More particularly, the present invention provides an intelligent graphing module whereby analytical techniques, such as aggregation, moving average, linear regression, exponential fitting, and the like, are available to any spread of data, all without the user having knowledge of the mathematics or theories supporting these analyses.

A method of the present invention for analytical graphing proceeds as follows. First, a data series is specified (by selecting a range of cells). Next, the system displays a selection of analyses. By examining the data type of the members of the data series (e.g., fixed, scientific, currency, percent, date, time, text, and user-defined data types), the system may intelligently determine which analyses are appropriate for the task at hand. Accordingly, the displayed list of analyses may be adjusted so that only relevant ones are available for selection. If any additional parameters are required for the selected analysis (e.g., center weighted), the user is prompted to enter appropriate values. The system then proceeds to generate a meta-data set by applying an operation or a series of operations required for the specified analysis; the "intelligence" or knowledge of the series of operations which are required to effect the analysis is maintained internally by the system (so that the user need not supply the information or even understand it). Finally, a visual representation of the analysis is displayed by plotting data points from the meta-data set. At the conclusion of the method, the meta-data set is discarded; however, if the user desires, he or she may save this information for future use.

BRIEF DESCRIPTION OF THE DRAWINGS

FIG. 1D is a simplified block diagram illustrating a functional model of the system, from the user's perspective.

FIG. 3A is a screen bitmap illustrating a sample spread of data (daily sales information) for a fictitious company.

GLOSSARY

Axis: Most graphs contain two axes: the x-axis runs horizontally along the bottom of the graph; the y-axis runs vertically on the left. The intersection of a point on each axis represents the data point.

Data Point: A single spreadsheet value displayed in a graph.

Label: In a spreadsheet, a label is a text entry. In a graph, labels are spreadsheet entries (of any type) that the user assigns to the graph to define plotted values.

Legend: A key displayed beside or beneath a graph that specifies the colors, marker symbols, or fill patterns for each series graphed.

Logarithmic: A method of scaling graphs where each major division of the scale represents 10 times the value of the previous division. Logarithmic (or log) scaling is best suited to widely varying, positive data.

Moving Average: A progressive average that smoothes fluctuating data points by averaging each point with a previous number of points (called a period). Moving averages can be weighted, so that each point in the period has a different weight, or emphasis.

Scale: The range of values associated with an axis.

Series: A set of cell values which are used for plotting a graph. For a simple graph, for example, each cell value is plotted sequentially as a data point on the graph.

Tick Marks: Scale indicators placed at regular intervals along an axis.

DETAILED DESCRIPTION OF A PREFERRED EMBODIMENT

General System

A. Hardware

Figure 1A:
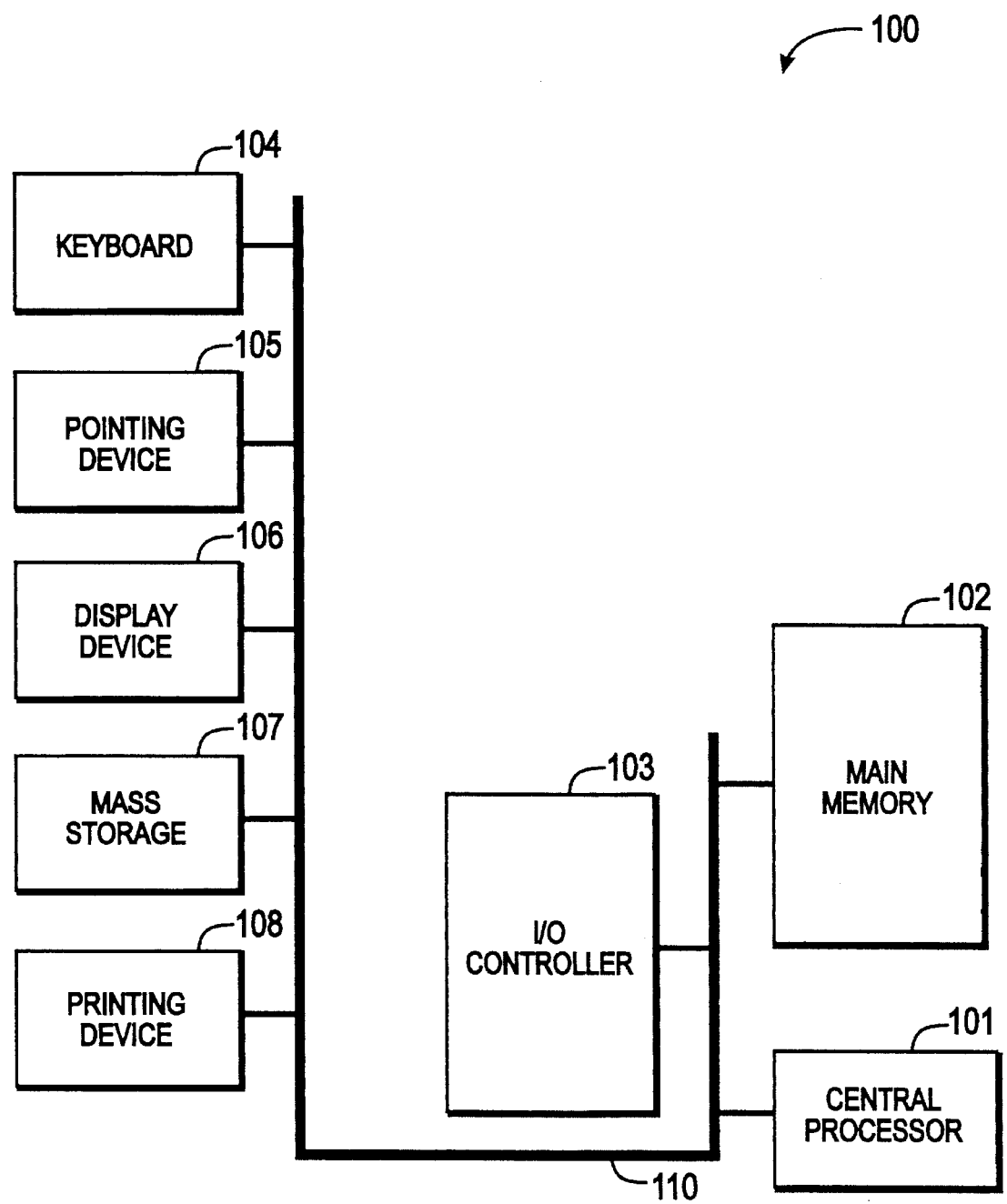
FIG. 1A is a block diagram of a computer system in which the present invention may be embodied.

As shown in FIG. 1A, the present invention may be embodied on a computer system such as the system 100, which comprises a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including IBM of Armonk, N.Y.).

B. Software

Figure 1B:
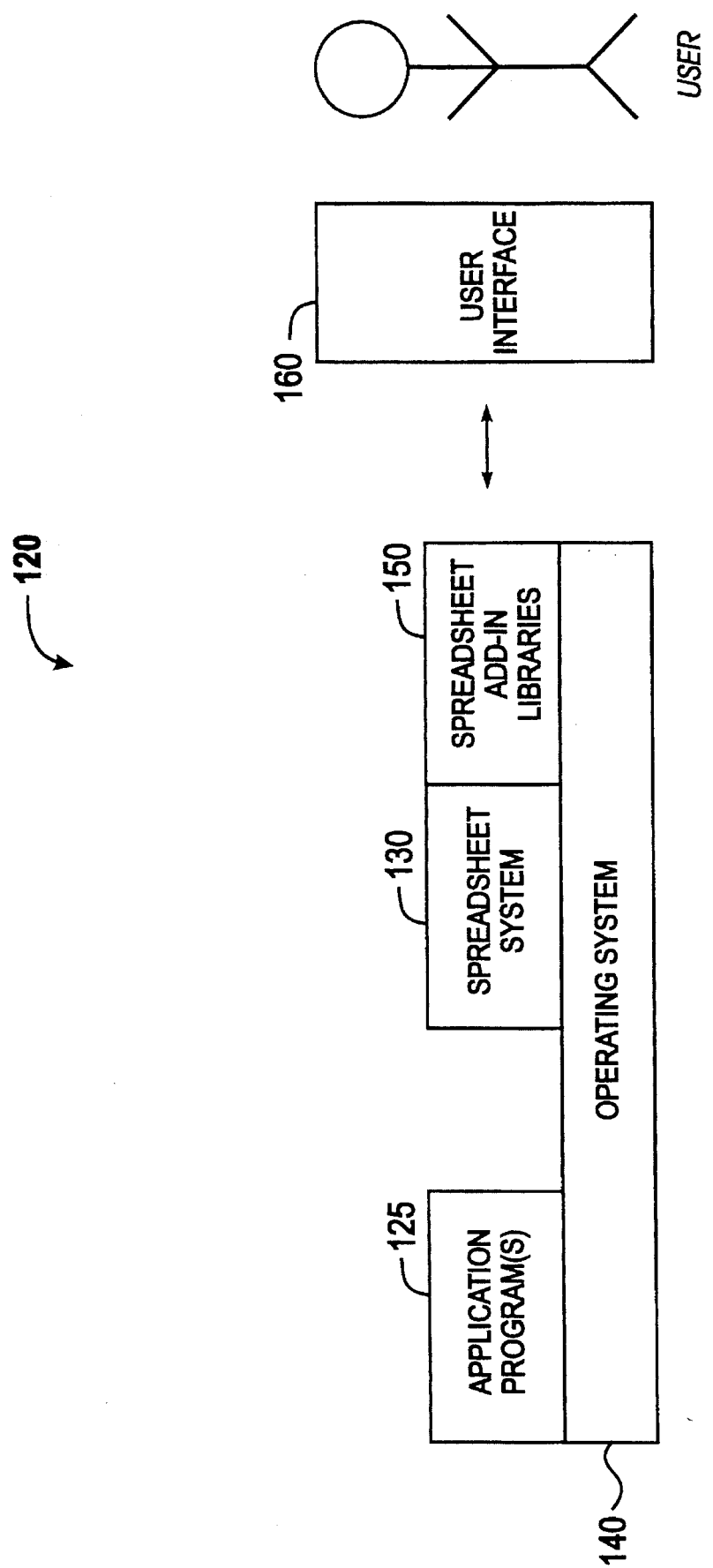
FIG. 1B is a block diagram of a software system of the present invention, which includes operating system, optional application software, and a spreadsheet system.

Illustrated in FIG. 1B, a computer software system 120 is provided for directing the operation of the computer system 100. Software system 120, which is stored in system memory 102 and on disk memory 107, includes a kernel or operating system 140 and a shell or interface 160. One or more application programs, such as application software 125, may be "loaded" (i.e., transferred from storage 107 into memory 102) for execution by the system 100. The system 100 receives user commands and data through user interface 160; these inputs may then be acted upon by the system 100 in accordance with instructions from operating system module 140 and/or application module 125. The interface 160, which may support a character-based and/or preferably a graphical user interface (GUI), also serves to display results, whereupon the user may supply additional inputs or terminate the session. In a preferred embodiment, operating system 151 is MS-DOS. Interface 160, on the other hand, is typically provided by the application programs and spreadsheet system 130, which will now be described.

As shown, system 120 also includes a spreadsheet system 130 of the present invention. The spreadsheet system 130 interfaces with the system 100 through the operating system 140. Spreadsheet system 130 may also be operably coupled to one or more spreadsheet add-in libraries, which are commercially available. In a preferred embodiment, the spreadsheet system 130 includes Quattro® Pro 4.0, available from Borland International of Scotts Valley, Calif.

Figure 1C:
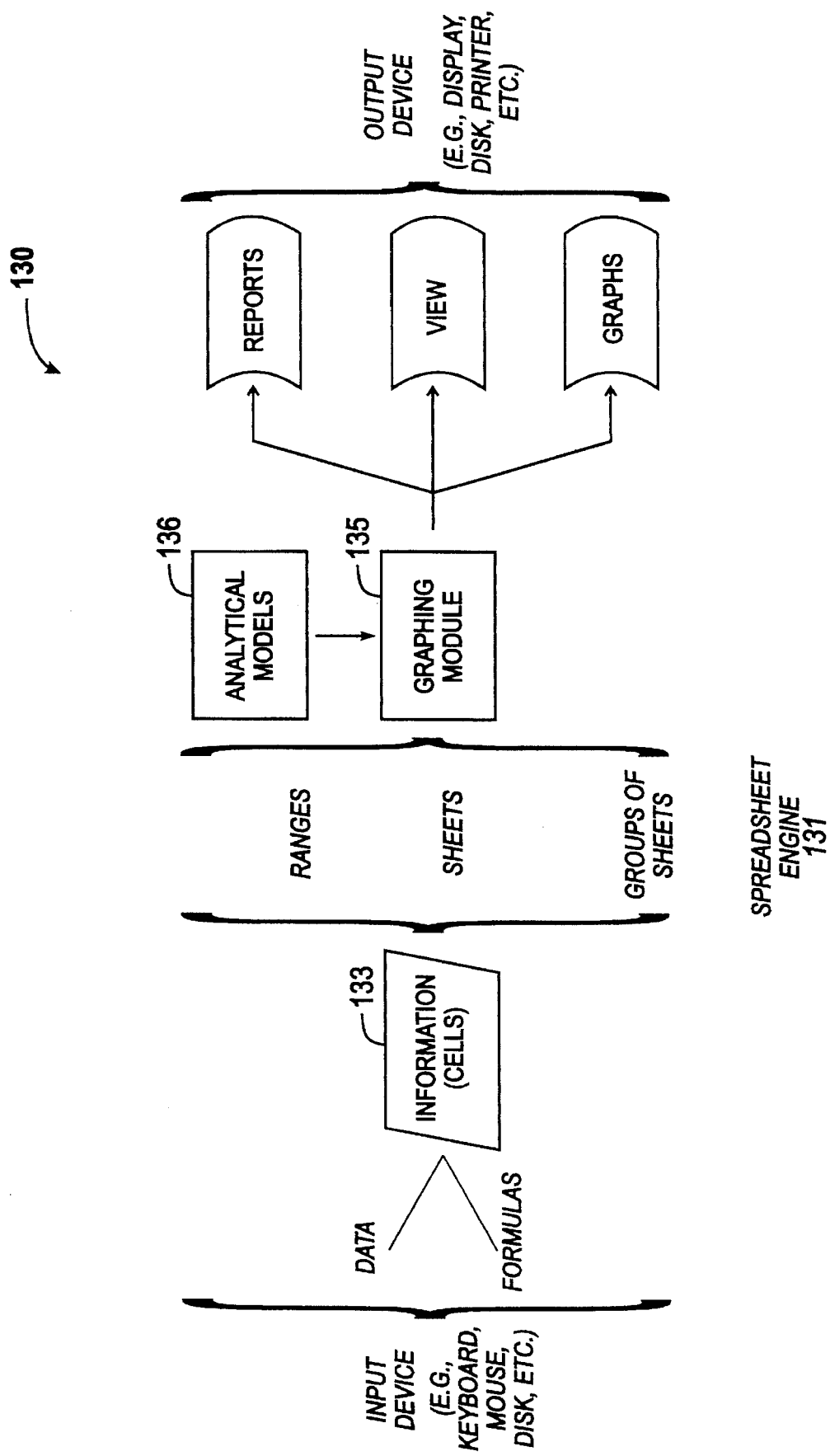
FIG. 1C is a simplified block diagram illustrating the basic architecture and functionality of the spreadsheet system of FIG. 1B.

Shown in further detail by a simplified block diagram of FIG. 1C, the system 130 includes a spreadsheet engine or module 131, a graphing module 135, and an analytical models module 136. In operation, the system maintains a spread of information cells 133, an atomic unit which is maintained and processed by the module 131. Data and formulas for the cells are received from an input device (e.g., keyboard, mouse, disk, and the like). From the cells, there may be larger groupings, such as ranges (including blocks), sheets (including 2D spreads), and groups of sheets (including 3D spreads, linked sheets, and pages of sheets or "notebooks").

The graphing module 135 provides the system 130 with the capability of displaying the spread of information visually, such as in various graphs. Coupled to the graphing module 135 is the analytical module 136, which maintains the various analytical models (e.g., aggregation, moving average, linear regression, exponential fitting, and the like) of the system. In this manner, the system 130 maintains built-in intelligence, whereby complex analytical graphs may be easily constructed by the user (who may know nothing about the underlying mathematics and theories supporting a given analysis).

Referring now to FIG. 1D, an abstraction of the functionality of the system 130, when viewed from the user's perspective, may be represented as follows. As shown by block diagram 170, the user stores his or her information in cells 133. The system, in turn, provides a plurality of operators 173 for manipulating or otherwise processing the cells 133. In a preferred embodiment, the system provides an evaluator 171, functionally interposed between the cells 133 and the operators 173, which includes knowledge necessary for performing various analyses. In this manner, the user may be insulated from the complexities of the operators 173. Specifically, the user need not understand the various functions provided by the operators (nor even know of the operators' existence); instead, this information is provided by the evaluator knowledgebase. All told, the present invention includes built-in intelligence such that a user need only specify what analysis is desired (as opposed to prior art techniques which also require the user to specify how an analysis is performed).

Spreadsheet system

A. Introduction

The operation of the system 130, with particular emphasis on analytical graphing methods of the present invention, will now be described in detail. The following description will focus on the presently preferred embodiments of the present invention, which are embodied in spreadsheet applications operative in an MS-DOS environment. The present invention, however, is not limited to any particular environment or any particular application. Instead, those skilled in the art will find that the system and methods of the present invention may be advantageously applied to a variety of systems, including different platforms such as Macintosh, UNIX, NextStep, and the like. Moreover, the methods of the present invention will find application in other programs for managing information, such as database management systems and the like. Therefore, the description of the exemplary embodiments which follows is for purposes of illustration and not limitation.

B. Spreadsheet interface

Figure 2A:
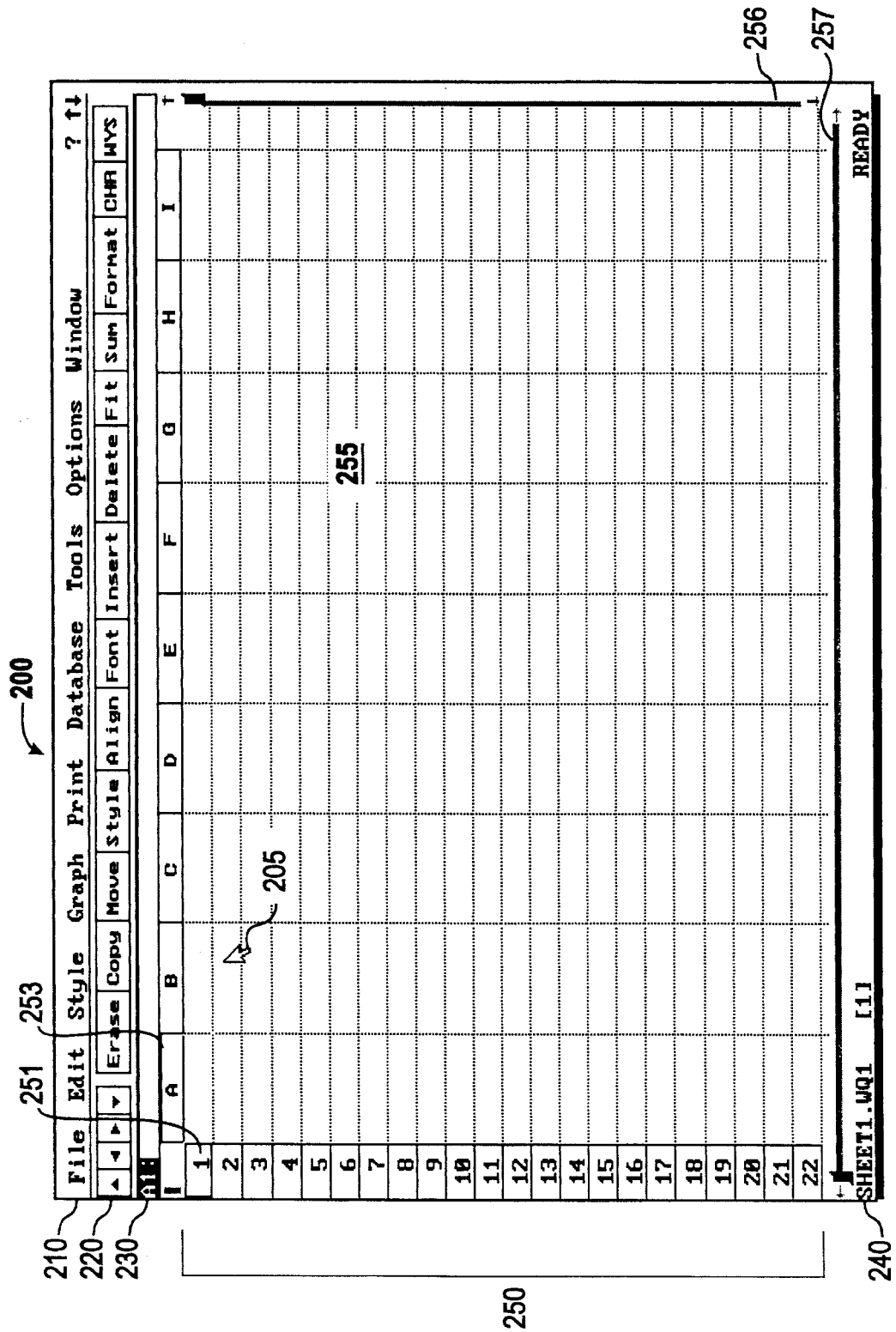
FIG. 2A is a screen bitmap illustrating a spreadsheet worksurface/interface of the present invention.

Referring now to FIGS. 2A–J, the user interface of the spreadsheet system 130 will now be described. As shown in FIG. 2A, the system 130 includes an interface or worksurface 200 having five distinct areas: a menu bar 210, a spreadsheet area 250, an input line 230 at the top, a status line 240 at the bottom, and a toolbar menu 220. Each component will be examined in turn.

Spreadsheet client area 250 is a rectangular or windowing interface, typically occupying most of the screen 106. It is the area where the user opens a spreadsheet (e.g., spreadsheet 255) and File Manager windows and make changes to spreadsheets. Through the window 250, the user views a portion of a spreadsheet at a time. To view other areas, the user scrolls the spreadsheet, using either the scroll bars 256, 257 or the arrow keys (from device 104). On both the vertical and horizontal scroll bars, a scroll box indicates the current position relative to the portion of the spreadsheet that contains data. To move to a different part of the spreadsheet, the user drags the scroll box along the scroll bar and then releases.

Spreadsheet 255 itself is a rectangular grid comprising columns 253 (identified by letters) and rows 251 (identified by numbers). Thus, it may be divided into the following parts. The horizontal border 253 is a row of letters. Each letter identifies a column of cells. Columns are marked with letters A–Z, then AA–AZ, BA–BZ and the like, up to IA–IV in a preferred embodiment. The column containing the cell selector appears on the border in reverse video (or in a contrasting color on a color screen). The vertical border 251 is a column of numbers (1–8192 in a preferred embodiment) that identifies each row of cells. It shows the row containing the cell selector in reverse video or a contrasting color, depending on the monitor.

Each intersection of a column and a row includes a cell. A cell is a location where the user can enter data, formulas, and the like. Each cell is identified by an address determined by the column and row that contain it. For example, the cell in the top left corner is cell A1. The letter and number that make up the address are the cell's coordinates. The cell selector is the highlighted rectangle that indicates the current cell. This is the cell that will be affected by the next action, such as entering a value. The user can move the selector to any cell in the spreadsheet.

To enter information in the spreadsheet, the user typically moves the selector to the cell (e.g., with a screen cursor 205 or keyboard 102) the user wants and types in the entry. The characters typed in appear on the input line. A cell selector, a highlighted rectangle, shows the user where the next character will appear. When the entry is complete, one presses Enter or an arrow key (Right arrow, Left arrow, PgUp, or the like). The system 130 writes the value into the current cell, erasing any previous entry. If the user enters the data by pressing an arrow key, the selector moves in the appropriate direction.

Multiple cells may be selected for aggregate operations. In particular, a block is defined as a rectangular group of cells identified by the cell addresses of two opposite corners—usually the upper left and bottom right cells. In response to user movement signals from the pointing device 105, the cursor may be "dragged" across a range of cells for selecting a block, as is known in the art. Once selected, blocks may be used in commands and formulas to act on several cells at once.

The input line 230 functions as follows. When the user selects a cell, for example, clicking it with the cursor 205, the input line at the top of the screen displays information about the current cell. The input line may display, for example, the following information about the current cell: cell address, value, formula, data types, formatting, forced data type (if any), and the like.

Status line 240 functions as follows. In Ready mode, the status line displays information about the current state of the program. File name shows the name of the current spreadsheet. A window number is displayed to indicate the number of the current window. The system assigns the numbers in the order in which the windows are opened.

With particular reference to FIGS. 2B–J the use of the menu bar 210 will now be described. A menu, such as File menu 211, is a list of commands or options. To initiate commands, the user calls up a menu or sequence of menus and chooses items. All menus branch from the menu bar 210. To activate the menu bar from the keyboard, the user presses the forward slash key (/). Once the user activates a menu, he or she can choose a command.

Menu bar 210 includes the following selections: file, edit, style, graph, print, database, tools, options, and windows. The file option is selected when the user wants to work with files, access the operating system or file manager, or exit the spreadsheet system. The edit option invokes a submenu for copying, moving, deleting, adjusting, and naming blocks of data. The style option invokes a menu for formatting blocks, adjusting columns, adding lines and shading, and creating and using named styles. The graph option allows the user to create, change, name, and display graphs (as described in further detail hereinbelow). The print option allows the user to print a spreadsheet or graph. The database option permits one to sort and query records, and also restrict data entry. The tools option invokes a submenu for using macros; working with spreadsheet links; performing "what-if" analysis, goal seeking, linear and non-linear programming, frequency distribution, regression analysis, matrix algebra, and the like; and tracing circular references and other errors. The options menu selection is used for setting system and spreadsheet defaults. Finally, the windows option is used for arranging the window display.

Toolbar menu 220 comprises a plurality of screen buttons providing instant access to user commands. In an exemplary embodiment, for instance, the following buttons/functions may be provided:

| Button | Function |
| --- | --- |
| Erase | Shortcut for /Edit!Erase Block. |
| Copy (CPY) | Shortcut for /Edit!Copy. |
| Move (MOV) | Shortcut for /Edit!Move. |
| Style (STY) | Shortcut for /Style!Use Style. |
| Align (ALN) | Displays the /Style!Alignment menu. |
| Font (FNT) | Displays the /Style!Font menu. |
| Insert (INS) | Shortcut for /Edit!Insert. |
| Delete (DEL) | Shortcut for /Edit!Delete. |
| Fit | Shortcut for /Style!Block Size!Auto Width. |
| Sum | Uses @SUM to total rows, columns, or both. |
| Format (FMT) | Displays the /Style!Numeric Format menu. |
| CHR | Switches to text (character) mode display. |
| WYS | Switches to WYSIWYG display. |
| BAR | Displays more buttons. |

For an additional description of the general features and operation of the system 130, see Campbell, M., *Quattro Pro 4.0 Handbook,* 4th Ed., 1992, the disclosure of which is hereby incorporated by reference.

C. Graphing

As shown in FIG. 1C, the system 130 includes the graphing module 130 for creating graphs from spreadsheet data. A graph is a visual representation of numeric information, often revealing information not immediately apparent in a table of numbers. Graphs offer a fresh perspective on the data stored in the spreadsheets. Often a graph will uncover a trouble spot or pinpoint the beginning of a new pattern. The user can then return to the spreadsheet data for a look at the data behind such areas. Graphs help both with analyzing past or present data and with visualizing future situations. Just as the user can set up a database to create what-if scenarios, the user can use graphs to help foresee future directions.

Figure 2B:
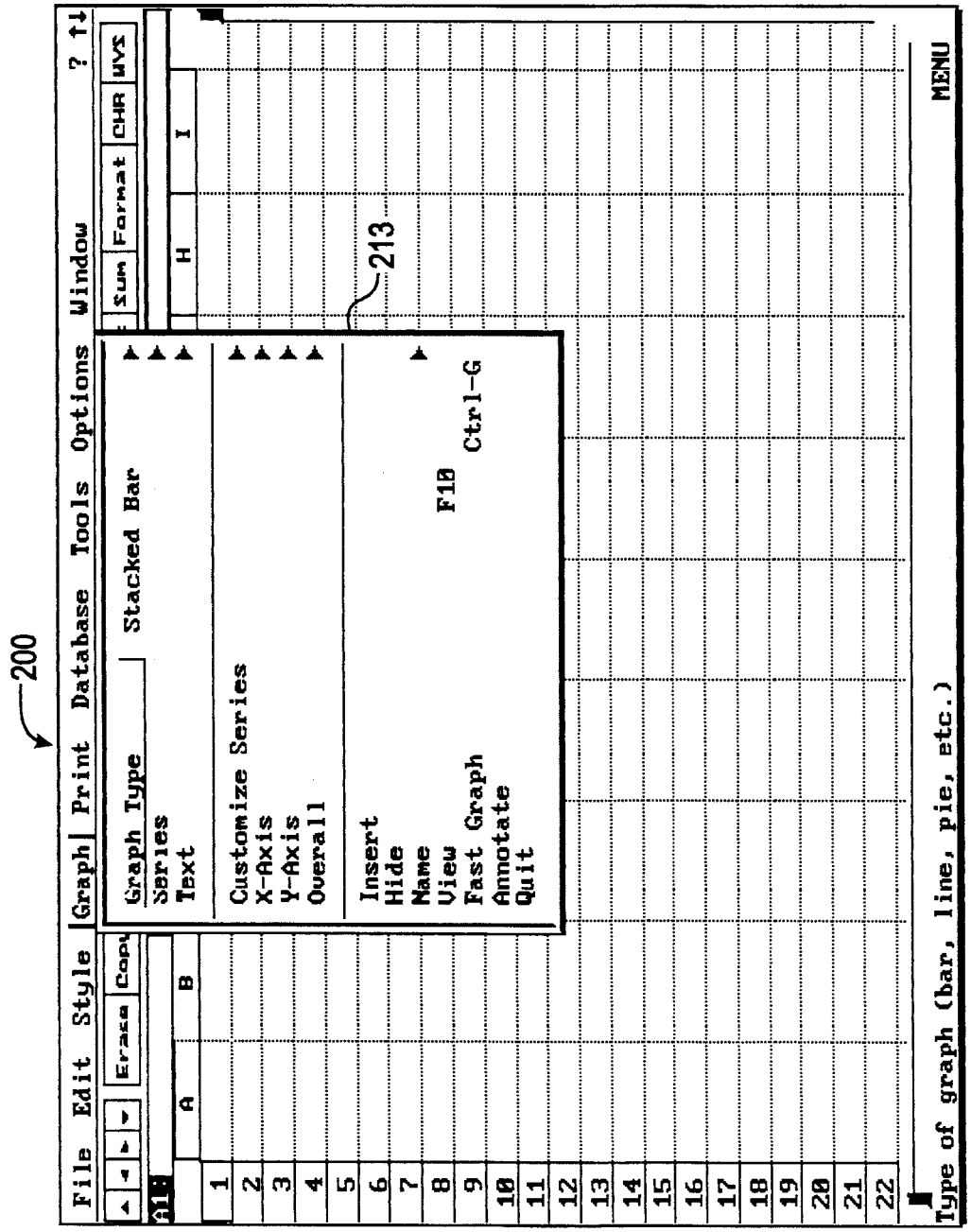
FIG. 2B is a screen bitmap illustrating Graph tools provided by the interface of FIG. 2A.

System 130 provides a spreadsheet interface 200, as shown in FIG. 2B. The interface 200 includes a Graph menu 213 having a plurality of graphing tools. Graph Type lets the user choose the basic graph type desired, such as Line, Bar, XY, Stacked Bar, Pie, Area, Rotated, Bar, Column, High-Low, Text, Bubble, and 3-D-graphs. Series lets the user specify up to six blocks of data to plot and one block of data to use as labels for the x-axis; the Series selection includes an Analyze submenu for allowing the user to transform series data (as described hereinbelow). Text lets the user add text to graphs, as well as change the typestyle, size, and color of that text.

Customize Series lets the user embellish graphs by changing marker symbols, colors, and fill patterns, and using a different graph type or y-axis scale for an individual series. X-Axis contains options related to the x-axis, including scaling and adjusting tick marks. Y-Axis contains options related to the y-axis, including scaling and tick marks. Overall lets the user add a three-dimensional effect to a graph, set grid options, and change background colors.

Insert lets the user paste a graph directly into the spreadsheet. Hide removes a graph from the spreadsheet. Name lets the user store graphs with the current spreadsheet, display a graph previously saved, delete graphs, create a slideshow, and copy graphs to other spreadsheets. View displays the current graph; to return to the Graph menu, the user presses any key except the slash key (/). Pressing / while a graph displays takes the user directly into the Annotator. Fast Graph automatically creates a graph from the block of data the user has specified. Annotate activates the Annotator, where the user can add text, arrows, lines, colors, clip art, and geometric shapes to graphs.

The basic procedure for building a graph is as follows. The user selects the type of graph he or she wants to create (for example, a line graph or pie graph). The type of graph the user may choose usually depends on the analysis the user wants to perform and what he or she wants to illustrate. The line graph is the most common business graph. It connects each value in a series with a line. If there are several series, a separate line represents each series. Line graphs plot values from left to right, in the order in which they appear in the spreadsheet. A line graph makes it easy to see dips and rises in a series of numbers, and they are often used to plot data over time to review patterns and predict trends.

Next, the spreadsheet data to be plotted are specified. In an exemplary embodiment, the user can specify up to six sets, or series, of values (with a /Graph!Series command). Upon selecting 1st Series from the Graph menu, for example, the user is prompted for a block of data. (If a block was previously assigned, it appears as the default and is highlighted.) Here, the user specifies the block of values to plot as the first series. To point out a block with the pointing device 105 (e.g., mouse), the user simply drags from one corner of the block to the opposite corner, then releases. To plot more than one series, the user simply repeats the process, specifying a block for each desired series.

In addition to the series to plot on the graph, an X-Axis Series is provided to allow the user to specify a block of labels or values to display along the x-axis as tick labels, to help define the data being plotted; unlike the y-axis, it generally has no numeric meaning and is simply used to place labels, from left to right, in the order in which they appear in the spreadsheet. Group selection is provided to let the user specify a block of values for the system to divide into separate series—either one column or one row per series. In addition to selecting data, the user can embellish the graph with text, arrows, and geometric shapes using Graph annotation tools which are provided.

After completing his/her selections, the user "views" the graph by invoking the View command. In response, the system constructs the specified graph and displays it on the screen device 106. Also, at any time while building a graph above, the user can view what he or she has assigned so far by invoking the view command. Once satisfied with the results, the user may print the graph and save it for future use.

Analytical Graphing

A. Introduction

According to the present invention, the spreadsheet system 130 also includes an analytical graphing module. Analytical graphing means the user can analyze spreadsheet data according to desired specifications, then graph the results without changing the spreadsheet. If a spreadsheet contains daily sales totals, for example, but the user want to graph average monthly totals, the system can calculate and graph this information without changing the spreadsheet. Or, if the daily sales vary widely, the system can display a moving average, which smoothes the data points. The system can also show a general trend, if one exists, by fitting the data with a line or an exponential curve. Thus, when the user uses analytical graphing of the present invention, the system calculates new data points and graphs them, all without the user knowing or understanding the theory or mathematics behind the analytical formulas.

From the user's perspective, analytical graphing is basically a two-part process. First, the user decides what information is to be analyzed; specifically, the user assigns blocks of data to each desired series, as described above (using /Graph¦Series command) for basic graphing. Second, the user specifies what relationships (analysis type) to investigate. To accomplish the latter, the system provides a plurality of Analyze commands; each will be described in turn.

B. Analysis types

After specifying the first series to analyze, the user selects the type of analysis he or she wants performed. Using the Analyze command (/Graph¦Series¦Analyze), the user can analyze spreadsheet data, then the system graphs the results without changing the underlying spreadsheet. In an exemplary embodiment, the following types of analyses are provided: Aggregation, Moving Average, Linear Fit, and Exponential Fit. Aggregation combines multiple data points and plots them as a single point that may be the sum, average, standard deviation, minimum, or maximum of the data. Moving average smoothes fluctuating data points by plotting progressive averages. Linear fit generates a line that best fits the data using simple linear regression. Exponential fit generates a curve to fit data that increases or decreases exponentially. A (result) Table option is also provided to let the user generate a table of results in the spreadsheet.

1. Aggregation

Aggregation lets the user aggregate multiple data points and plot them as a single point that may be the sum, average, standard deviation, minimum, or maximum of the data. Plotting aggregates transforms the selected graph series and reveals relationships not immediately apparent in the spreadsheet, such as weekly averages for information recorded daily. In an exemplary embodiment, submenus are provided for indicating (1) Series Period; (2) Aggregation Period; and (3) Transformation (function) type. Each will be described in turn.

The Series Period menu command is invoked for indicating what the series values represent (i.e., what period exists) in the series. Since the user will often aggregate a series according to a time period, the Aggregation commands are preferably based on 1 day representing a period of 1. Thus, Days (the default) represents a period of 1; Weeks represents a period of 7; Months represents a period of 30; Quarters represents a period of 90; and Years represents a period of 360 (traditional accounting year). If a series contains weekly information, for example, one would choose Weeks on the menu. For the purposes of aggregation, the system employs the following standard time periods.

| | Standard time periods | | |
| --- | --- | --- | --- |
| A week has | A month has | A quarter has | A year has |
| 7 days | 30 days | 90 days | 360 days |
| | 4 weeks | 12 weeks | 51 weeks |
| | | 3 months | 12 months |
| | | | 4 quarters |

An Aggregation Period menu command is also provided for indicating how many data points are combined for each point on the graph. The user may choose among the following types. Weeks (the default) shows weekly data, or aggregates by 7; Months aggregates by 30; Quarters aggregates by 90; and Years aggregates by 360. An Arbitrary option is also provided to let the user specify a particular (user-defined) aggregation period. Thus if one enters 3 (i.e., to show aggregates of 3 or information every three days), the Series Period is set to Days. Finally, the aggregation period set by the user is checked to make sure it is larger than that entered for the series period (so that the system does not, for example, transform monthly data into weekly data).

A Function menu command is provided for indicating what transform the system applies to the data. In an exemplary embodiment, for instance, SUM (the default) totals the data (analogous to applying a spreadsheet @SUM function to the data); AVG averages the data (@AVG function); STD calculates a population standard deviation (@STD function); STDS calculates a sample standard deviation (@STDS function); MIN specifies a series minimum (@MIN function); and MAX specifies a series maximum (@MAX function). Those skilled in the art will appreciate that other operations may be employed in a like manner effect desired transformation of the data.

All told, aggregation commands may be viewed as handy standards for simple periodic aggregation. For example, when the user sets the Series Period to Days (Series Period¦Days), Aggregation Period to Months (Aggregation Period¦Months) and Function to average (Function¦AVG) the system will average 30 data points, plot the average, then average the next 30 points, plot the average, and so forth.

2. Moving Average

Moving Average smoothes fluctuating data points by plotting progressive averages. Starting with the first point in the series, the system calculates and plots the average for a specified previous number of points, called a period. At each following point, the system maintains the specified period: It drops the oldest value, the one farthest from the new point, so the number of points being averaged is always the specified period. The system then calculates and plots the new average, and continues in this manner.

To specify the range of influence, the user can indicate a period, which is a number of previous daily totals to average with each point and move on to the next point. If the period is set to 3, for instance, the system starts with the first day's sales and plots this value. For the second average, the system moves to the second day, averages the first and second day's totals, and plots the average. The system moves to the third day and calculates the average of the third, second, and first day's sales, then plots the average. At the fourth day, the system drops the first day's sales and averages the second, third, and fourth day's sales. With Period set to 3, at each day, the system averages the day's sales with the previous two. In this way, each point is tempered by previous points and data is smoothed to show a general trend.

The user can apply a simple or weighted moving average by using Period and Weighted commands of the system. Period indicates a number of points to average. Weighted, on the other hand, specifies that the operation is to be Weighted, that is, the system numerically places greater emphasis or weight on recent points (closest to the point being worked on) and less weight on older points (farthest from the most recent point). The default setting is non-weighted (No).

3. Linear Fit

Linear Fit generates a line that best fits the data, using simple linear regression. Linear Fit is useful for showing a general trend among fluctuating points; it is also easier for one to grasp regression information in graph form than in a table.

After specifying a series (desired range) of data, the user invokes a Linear Fit command (/Graph!Series!Analyze!Linear). In response, the system generates a line that best fits the data. With Linear Fit, the system calculates and plots linear regression information in a line, even if the data does not have a general trend.

4. Exponential Fit

Similar to the above, Exponential Fit generates a curve to fit data that increases or decreases exponentially. For this feature to work, all values in the series must be of the same sign, either all negative or all positive. Blank cells in the series are treated as zeros. To fit exponential data with a curve, the user specifies the series containing the data and then chooses an Exponential Fit command (Series!Analyze!nth Series!Exponential Fit) In response, the system generates a curve that best fits the data.

5. Table (Results)

The Table command lets the user generate a table of analytical graphing results in the spreadsheet. The system performs the specified analysis before it draws the graph. The user does not have to view the graph in order to see the results. To produce a result table, the user specifies a series (/Graph!Series) and an analysis type (Aggregation, Moving Average, Linear Fit, or Exponential Fit), then the user chooses the Table command and specifies a target block for the table. The user can indicate an entire block or specify only one cell as the top cell of the table. If the user specify one cell, the system extends the block downward as needed. The system generates the table and places it at the specified target. The table may be saved, graphed, or otherwise processed as desired.

B. Examples

Referring now to FIGS. 3–4, exemplary methods and interface of the present invention for analytical graphing will now be illustrated with a sample set of data. As shown in FIG. 3A, an ANALYZE.WQ1 spreadsheet 310 is loaded into the spreadsheet worksurface 310. The spreadsheet includes daily sales totals for a fictitious company, MouseStrap.

1. Aggregation example

Suppose the user wants to see average weekly sales. With a conventional electronic spreadsheet, this would entail a lot of work on the part of the user (redesigning the spreadsheet). According to the present invention, however, methods are provided for the spreadsheet system to automatically graph average weekly sales, all without changing the spreadsheet.

Figure 3B:
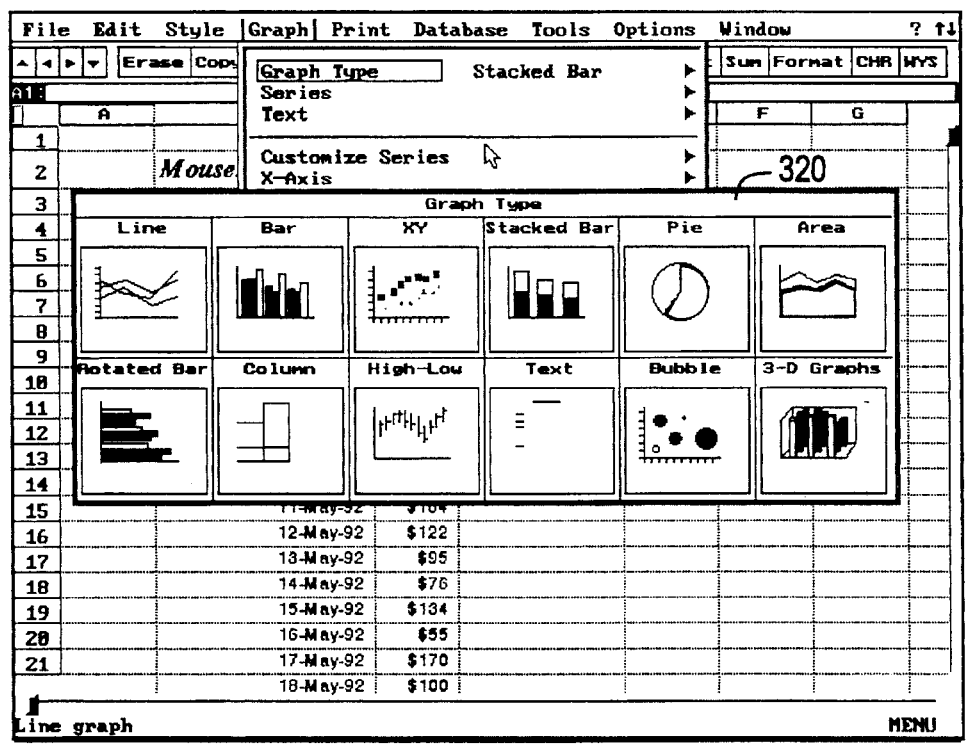
FIGS. 3B–D are screen bitmaps illustrating and interface and method of the present invention for creating an aggregation of information (in this example, a graph of weekly sales average).
Figure 3C:
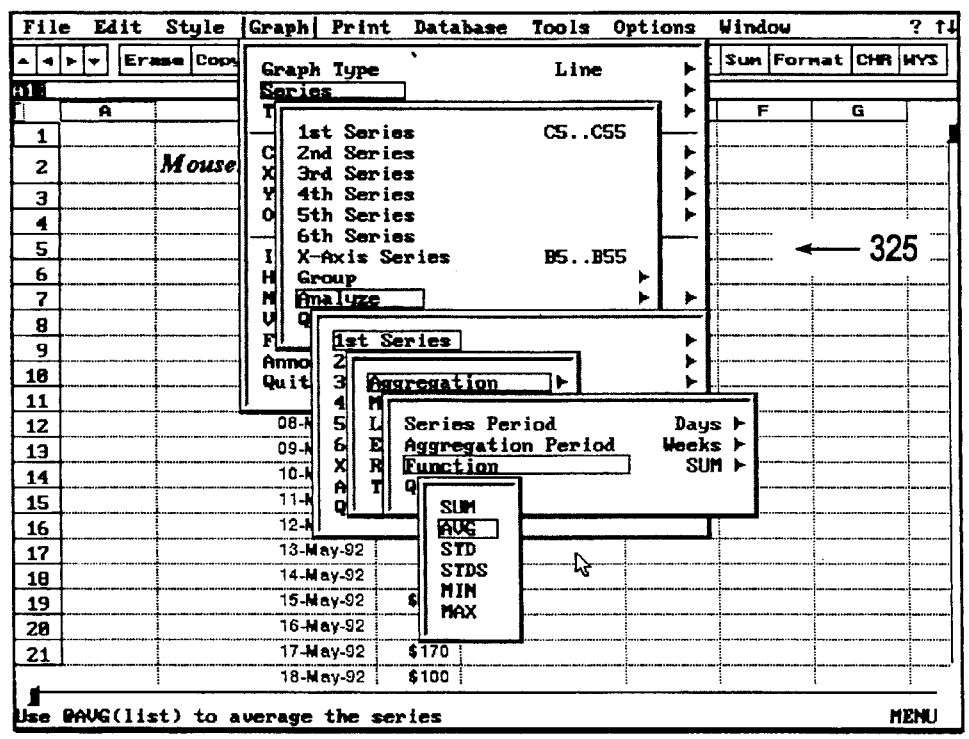
Figure 3D:
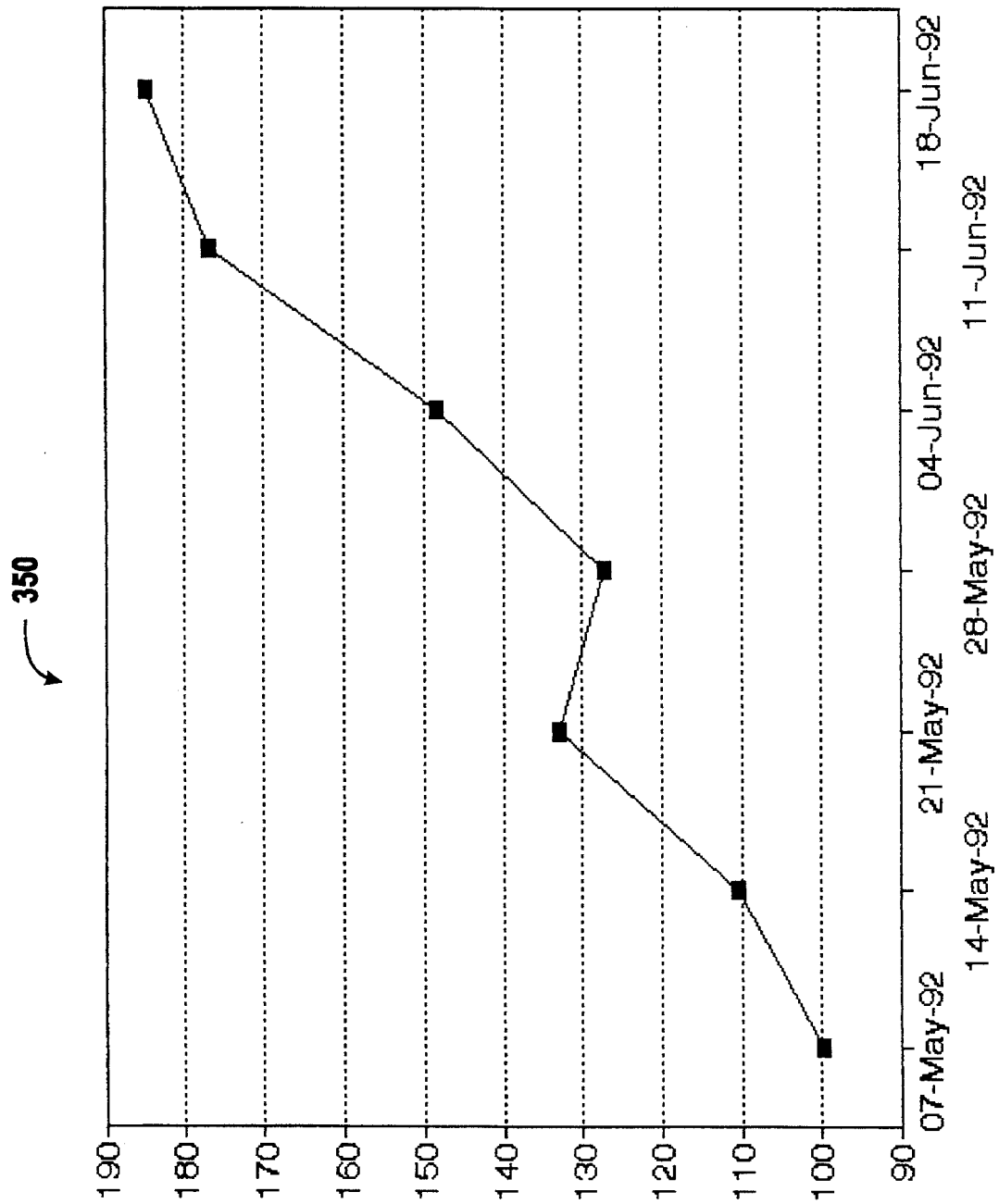

With particular reference to FIGS. 3B–D, an exemplary method of the present invention for aggregating the sales information of spreadsheet 310 is illustrated. First, a graph type is selected from a Graph Type palette 320, as shown in FIG. 3B. For aggregation, a line graph works well because it easily shows a progression over time and displays trends. The user may select the Line Graph option with the screen cursor or enter a keyboard equivalent command (e.g.,/Graph!Graph Type!Line). If the user specifies an X-axis series when aggregating a line graph, the system creates X-axis labels by showing every nth point in the X-axis series, where n is the aggregation period. When Aggregation Period is set to Weeks, for example, the system shows every seventh point in the X-axis series as an X-axis label.

After specifying a graph type, the user specifies the block containing the data he or she wants to aggregate. The user does this by selecting the 1st Series option with the mouse 105 or keyboard 104 (Series!1st Series) and then enters a range of cells (again by pointing with the mouse or entering with the keyboard). In the example at hand (for the data of spreadsheet 310), the user enters a range of C5 . . . C55. To add horizontal labels along the horizontal (X) axis, the user can specify the block containing data for the X-axis by choosing X-Axis Series and entering a range of cells. To label the X-axis with week ending dates (every seventh day), the user chooses X-Axis Series and enters B5 . . . B55.

Next, the user indicates the analytical operation desired for this series of data—aggregation (in this example). Specifically, the user invokes the Aggregation operation using the mouse and/or keyboard (Analyze!1st Series!Aggregation). To indicate what the 1st Series values represent, or what period exists in the series, the user sets up the period of the series (choose Series Period). Days is the Series Period default. Since the series values are daily sales (the series has a period of 1), this setting remains unchanged.

To indicate by what period the user wants to aggregate the series, one chooses Aggregation Period and then selects a standard aggregation period (or enters an Arbitrary one). Weeks is the Aggregation Period default. Since the user want weekly information (the user want to aggregate by 7), one leaves this setting unchanged. Finally, the transformation operation is set to Average (by choosing Function!AVG). After entry of the user selections, the spreadsheet 310 appears as shown in FIG. 3C (with the user choices represented in cascading submenus 325).

The user may now proceed to view the graph (e.g., by pressing F10). As shown in FIG. 3D, an aggregation graph 350 is displayed; each point of the graph represents a weekly sales average. Since the aggregation period is 7, every seventh day labels the X-axis. In a preferred embodiment, the system ignores the last aggregate of data if it is not a multiple of the aggregation period. For example, if the aggregation period is set to Weeks and the points are not evenly divisible by 7, the data points that follow the last group of 7 do not show on the graph as an aggregate.

2. Multiple relationships in one graph

System 130 allows a user to easily view more than one relationship in the same graph, all without redesigning the spreadsheet and without repetitive calculations. If the user aggregates by the same period for each analysis, he or she can view multiple relationships in the same graph.

Figure 3E:
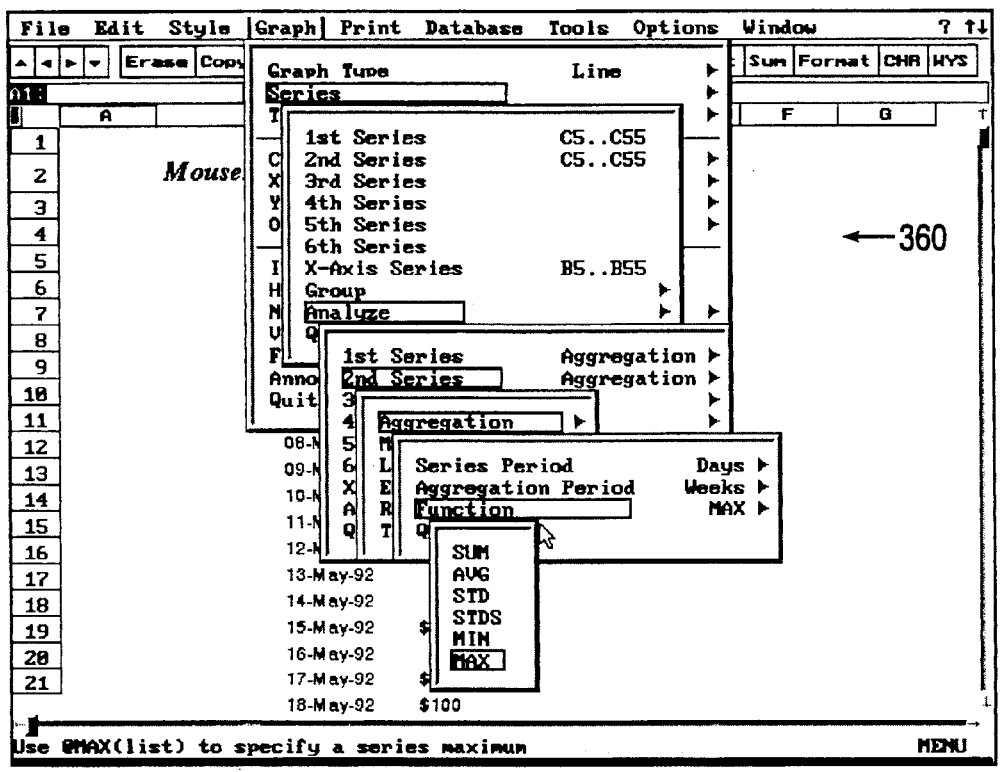
FIGS. 3E–F illustrate an interface and method of the present invention for creating and displaying multiple relationships in a single graph.
Figure 3G:
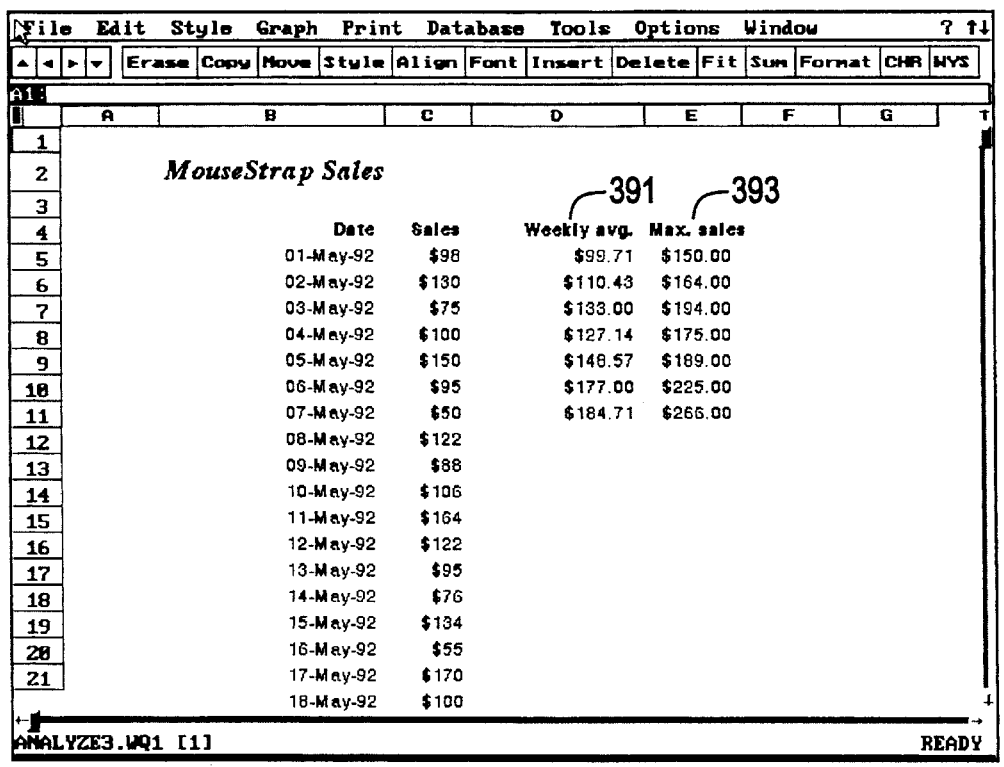
FIG. 3G is a screen bitmap illustrating a Table operation of the present invention for placing analytical information directly within a spread of user-supplied data.
Figure 3F:
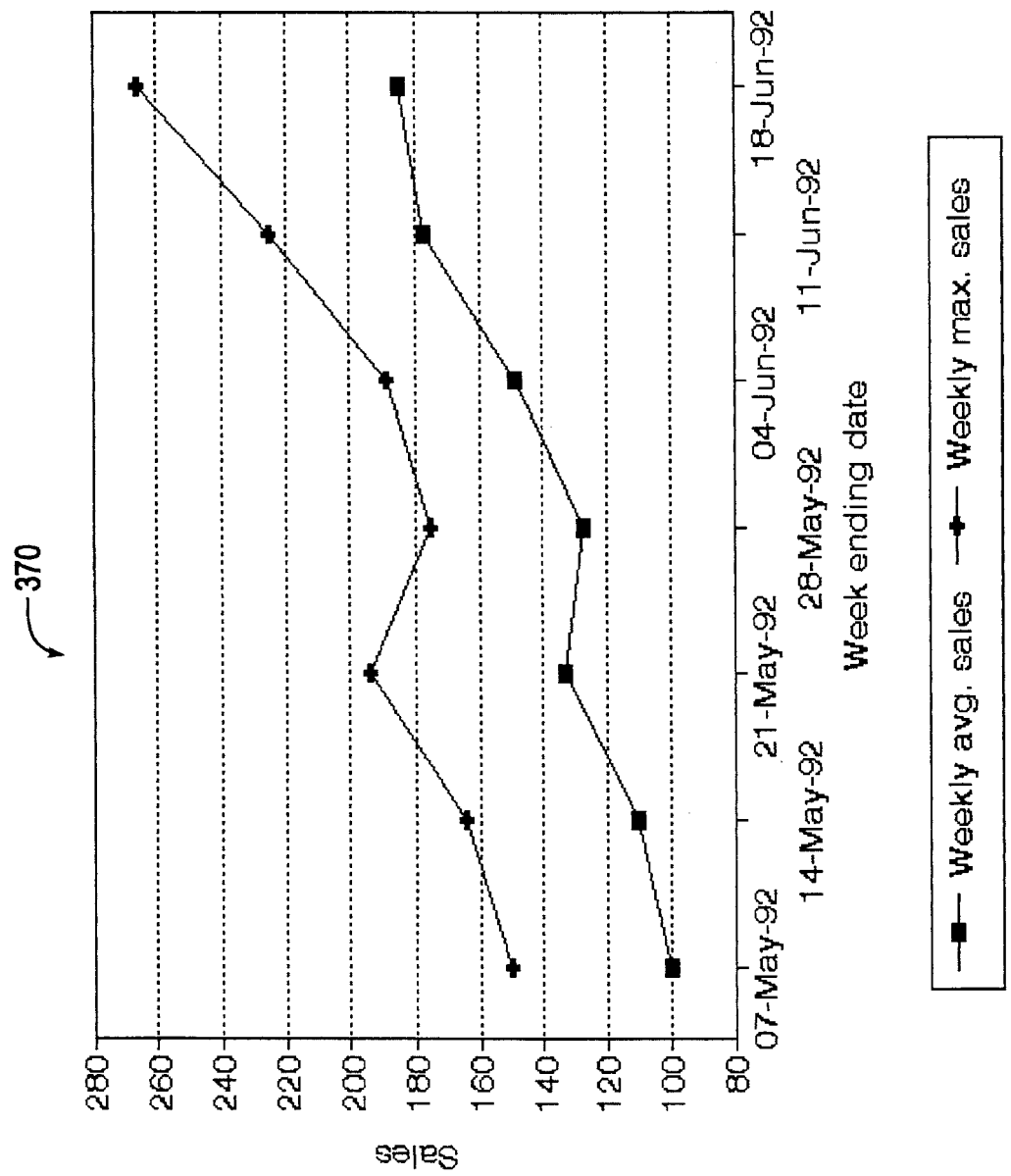

Illustrated in FIGS. 3E–F, this method will now be demonstrated. Suppose that the user wants to view weekly maximum sales in the same graph as weekly averages (as shown in the previous figure). The user would proceed as follows. First, the user adds another series; as shown in FIG. 3E, for example, the user has selected a range of C5 . . . C55 as the second series (e.g., choose Series¦2nd Series and enter C5 . . . C55). Now the user proceeds to specify an aggregation analysis for this second series (e.g., choose Analyze¦2nd Series¦Aggregation). In this example, the Series Period is left set to Days, and the Aggregation Period is left set to Weeks. To specify maximum, one chooses the MAX function (Function¦MAX) At the completion of this step, the user's selections are displayed as shown in the cascading submenus 360 of FIG. 3E.

If desired, the user may add legends to the graph using Text¦Legends commands of the system 130. For example, one may enter the following descriptive labels. Under 1st Series, one may enter "Weekly avg. sales". For the 2nd Series, one may enter "Weekly max. sales". For the X-axis, "Week ending date" may be entered; for the Y-axis, "Sales" is appropriate.

After specifying the graph, the user may now view the graph (e.g., by pressing F10). In response, the system 130 constructs and displays the graph 370 of FIG. 3F. As shown, weekly maximum and average sales are displayed in the same graph. Like any graph, the user can use the Graph menus or the Annotator to further customize the graph or return to the spreadsheet for further data entry or modification.

3. Table example

The Table command (Analyze¦nth Series¦Table) lets the user display analytical graphing information directly in the spreadsheet. Continuing with the previous example, the Table command will be illustrated for viewing weekly average and maximum sales values in the spreadsheet 310. As described above, the range of C5 . . . C55 has been previously entered for both the first and second series; the former for determining weekly average sales, the latter for determining maximum sales values.

To create a table of weekly average and maximum sales, the user proceeds as follows. First, the user selects the table command for the first of the two series (e.g., /Graph¦Series¦Analyze¦1st Series¦Table); recall that this range has been previously used to generate the weekly average values. Next, a target or destination in the spreadsheet 310, such as cell D5, is entered; this will serve as the top cell of the block for the table. The user can specify a block or only the top cell; the system extends the block downward as needed. The system now places the weekly averages table in the spreadsheet, as shown by table 391 of FIG. 3G.

After completing the first series, the user proceeds to select the table command for the second series (choose 2nd Series¦Table). Again, a destination (e.g., cell E5) in the spreadsheet is entered. The system now places the weekly maximums table in the spreadsheet, as shown by table 393 of FIG. 3G. The tables list the calculated weekly averages and weekly maximums. The user can label the tables as desired a title.

4. Moving average example

Because daily sales vary widely, the user may want to determine a general trend by smoothing data points. By selecting the Moving Average method, the user can plot progressive averages, so each day's sales is influenced by previous day's sales.

Figure 4A:
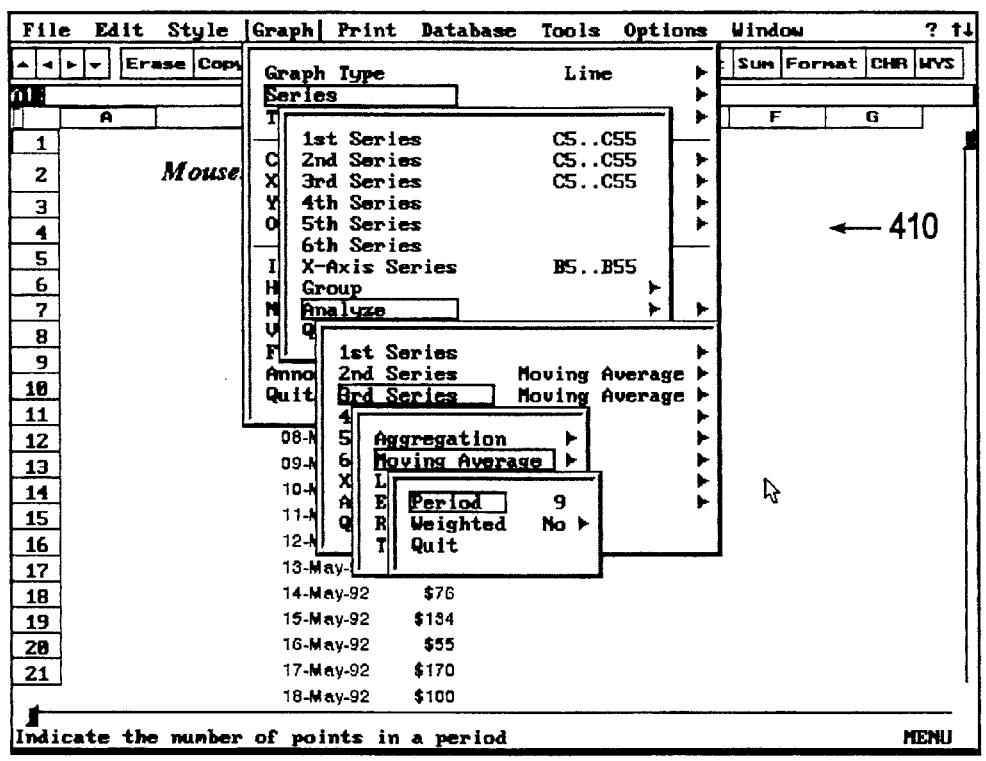
FIG. 4A is a screen bitmap illustrating an interface and method of the present invention for creating a moving average analysis on the spread of information (from FIG. 3A).
Figure 4C:
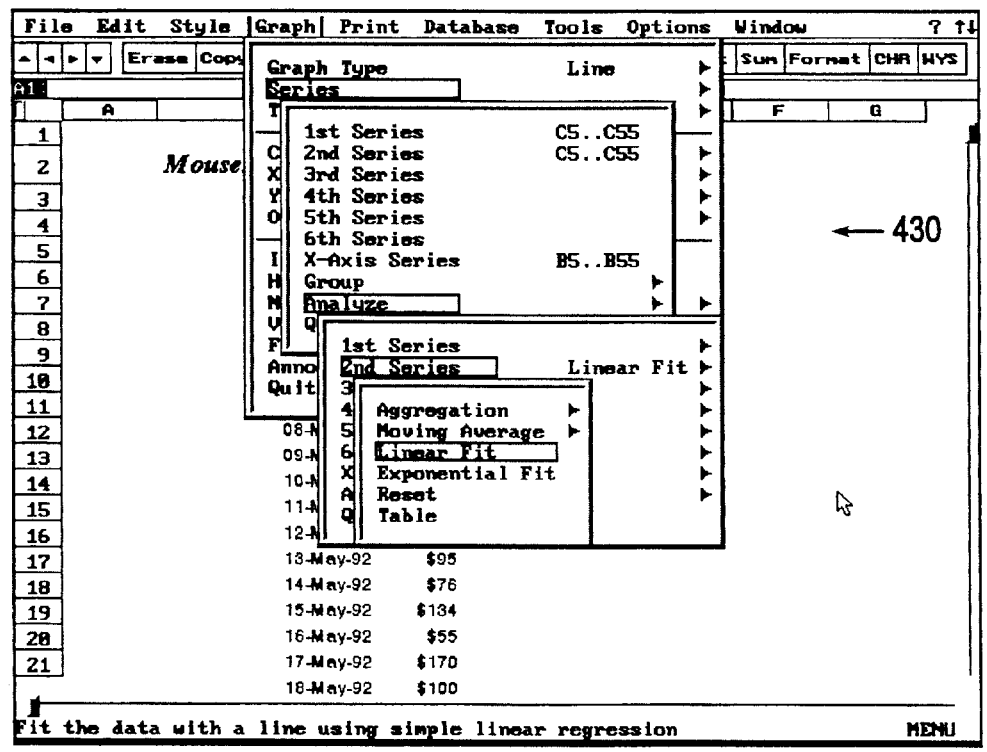
FIG. 4C is a screen bitmap illustrating an interface and method of the present invention for creating a linear fit from the user-supplied data (of FIG. 3A).
Figure 4B:
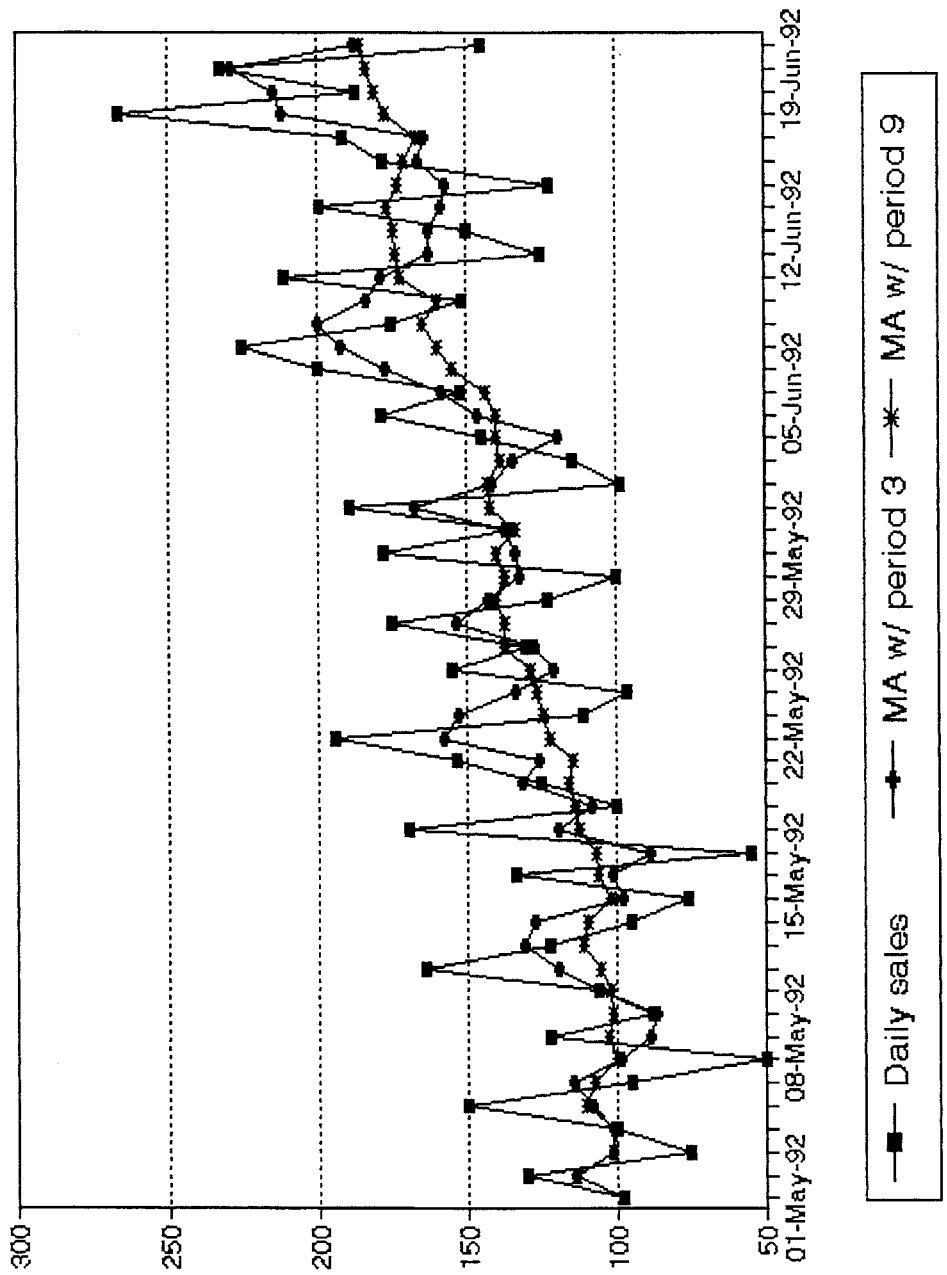
FIG. 4B is a graph of moving averages against sales data, as requested by the user through the interface of FIG. 4A.

Illustrated in FIGS. 4A–B, this method will now be demonstrated. In this example, the user wishes to display and compare two moving averages in the same graph as daily sales. Continuing with the previous example (1st Series and 2nd Series are C5 . . . C55, and X-Axis is B5 . . . B55), the user specifies a third series (3rd Series is C5 . . . C55). For the second series, the user selects an analysis type of moving average (choose Analyze¦2nd Series¦Moving Average); for the Period, the user enters 3. This operation is repeated for the third series except the Period is set to 9 (choose 3rd Series¦Moving Average¦Period, enter 9). Upon completion, the interface 300 displays the user's selections in cascading submenus 410, as shown in FIG. 4A.

The user may now view the graph (e.g., by pressing F10). As shown by the graph 420 of FIG. 4B, the system 130 compares two different moving averages against daily data in one graph; one with a period of 3, the other with a period of 9. Against the fluctuating daily information, a moving average with a period of 3 provides a smoother line through the daily data. A moving average with a period of 9 provides an even smoother effect. Note: The larger the period, the smoother (and less true to the daily totals) is the line formed by Moving Average. As before, the user may apply text, legends, labels, or otherwise.

The user may readily apply a weighted moving average to the analysis to place greater emphasis, or weight, on recent points and less weight on older points. To convert one of the above to a weighted moving average, the user simply chooses the Weighted option (Weighted¦Yes) for the respective series.

Although tedious to do by hand, a weighted moving average may be readily performed by the system 130. The general methodology employed by the system is as follows. First, the oldest point (i.e., the point farthest from the point the system is working with) is multiplied by 1, the next multiplied by 2, and so on, until the most recent point is reached; this last point is multiplied by the period specified. For example, with Period set to 3, the oldest point is multiplied by 1, the next one by 2, and the most recent point is multiplied by 3. The weighted moving average is determined by dividing the sum of the weighted points by the sum of the weights (In this example, 1+2+3).

5. Linear fit example

Figure 4D:
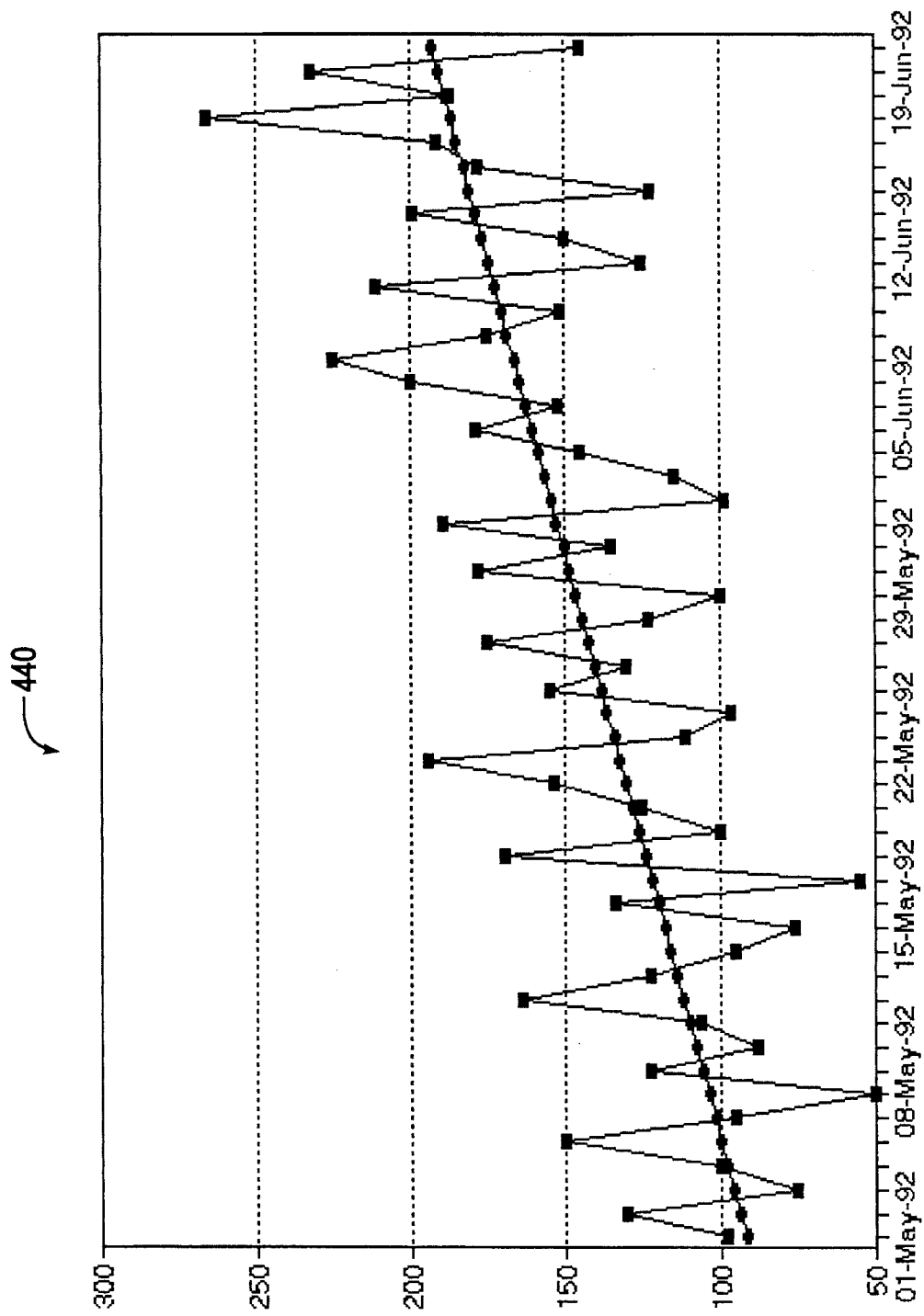
FIG. 4D is a graph of daily sales (from FIG. 3A) fitted to a line.

Linear Fit generates a line that best fits the data, using simple linear regression. Referring to FIGS. 4C–D, this method will be illustrated by fitting daily sales data to a line. Continuing the example (with 1st Series and 2nd Series set to C5 . . . C55, and X-Axis set to B5 . . . B55), the user specifies a Linear Fit analysis for the second series (choose Series¦Analyze¦2nd Series¦Linear Fit). Upon completion, the interface 300 displays the user's selections in cascading submenus 430, as shown in FIG. 4C.

The user may now view the graph (e.g., by pressing F10). As shown by the graph 440 of FIG. 4D, the system 130 plots a line through the daily sales information. Linear Fit calculates and plots linear regression information in a line, even if the data does not have a general trend. To view linear regression information in the spreadsheet, the user may generate a table as previously described in the Table section.

Internal operation

Figure 5:
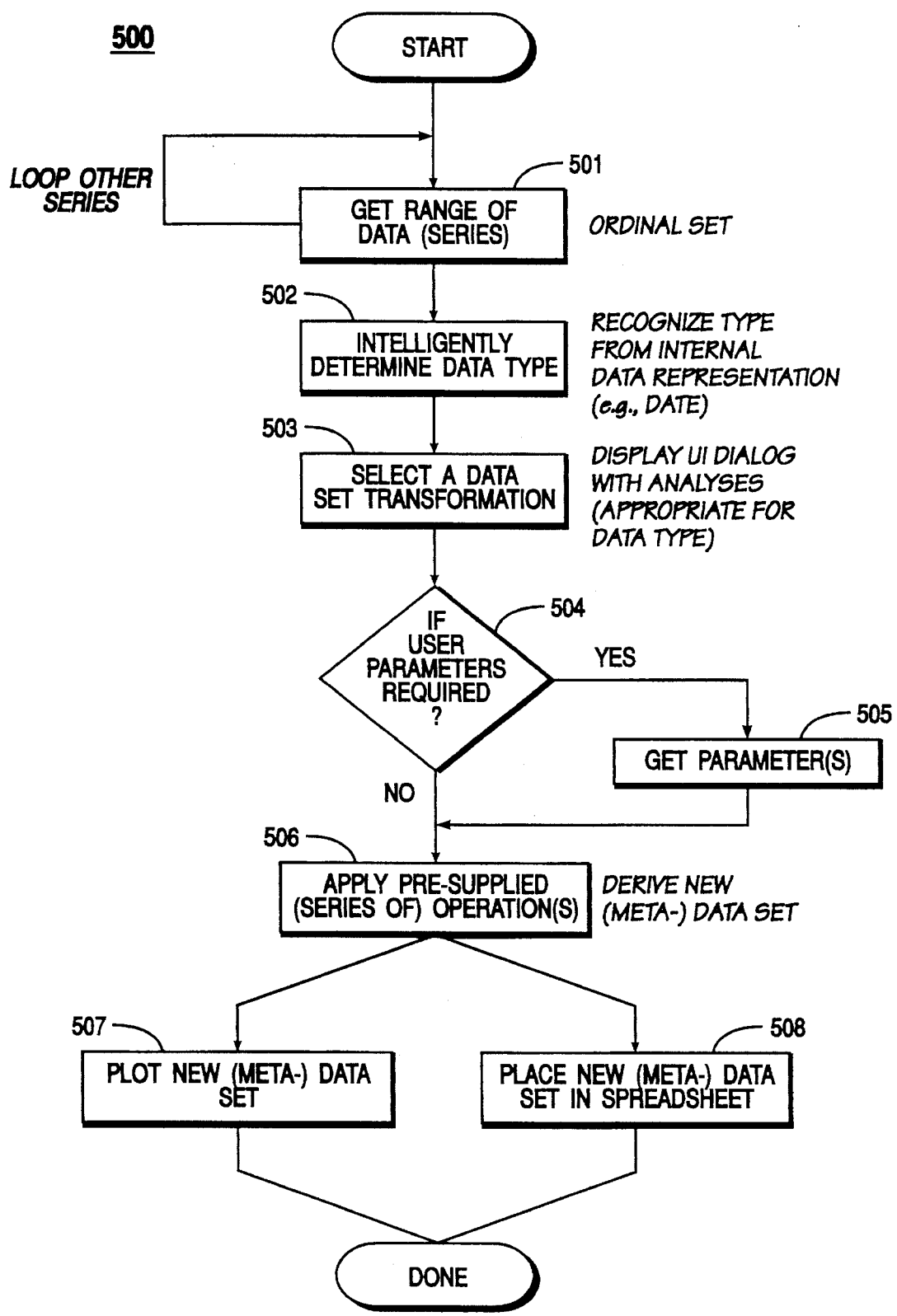
FIG. 5 is a flowchart illustrating a method of the present invention for visually analyzing one's data with analytical graphs.

Referring now to FIG. 5, a preferred method 500 of the present invention for interpreting information with analytical graphs will now be described. At step 501, a series is defined, for example, by specifying a range of information members (cells); this represents a data series. As previously described, the system of the present invention provides a preferred interface (e.g., menus 360 of FIG. 3E) for receiving the data series (typically, via keyboard and/or mouse input).

In a preferred embodiment, the series represents an ordinal set, that is, a first data point, a second data point, a third data point, and the like. This information may be deduced from the relative position of each information cell relative to other information cells of the selected range. The system may, for instance, accept a range of cells which are spatially arranged in the spreadsheet from left to right, where the left most cell is the first member of the set and the right most cell is the last member of the set. Similarly, the system may accept a vertically-oriented range, where the top most cell is the first member of the set and the bottom most cell is the last member of the set. Such a determination is simplified if ranges are restricted to blocks of contiguous cells.

Next, the method may proceed to display a selection of available analyses; but first, however, it is desirable to examine the type of information comprising the above-selected range so that only those analyses which are appropriate for the selected information are presented to the user. Thus, at step 502, the system intelligently determines the data type (e.g., from among fixed, scientific, currency, percent, date, time, text, and user-defined data types) for the information selected in the range. For instance, the system may determine that a range includes members which are temporally related (i.e., varying over a period of time); accordingly, the system may suggest an aggregation analysis. Those skilled in the art will appreciate that data types (e.g., date, currency, percent, floating point, integer, and the like) may be readily determined from internal data representation and/or format settings for the information of interest. Also, heuristic information about data types (e.g., a particular range of integers representing 20th century dates) may be provided using known expert system technique (typically in the form of an inference engine with one or more knowledgebases). By examining this information beforehand, the system of the present invention may intelligently guess the analysis desired by the user (or subset of analyses from those available). Alternatively, in a simple embodiment, step 502 may be eliminated, whereby a simple list of available analyses is displayed; in such a case, the user would determine which analysis is appropriate for his or her information set.

At step 503, a desired analysis or data transformation is selected. As shown by the menus 360 of FIG. 3E, for example, the system of the present invention includes a user interface dialog to facilitate this selection. If the optional step 502 was performed, then the dialog will preferably display only those analyses which are appropriate for the selected information (as determined from its type).

At step 504, the method determines whether any user-supplied parameters are required. In a moving average analysis, for instance, the user may specify whether the analysis is center-weighted. If additional parameters are required (yes at step 504), then the method proceeds to step 505 for retrieving the relevant parameters. If the type of information comprising the range was determined above (at step 502), then the parameters appropriate for display may be intelligently determined. For time-based information, for instance, appropriate parameters may include a display of business weeks, calendar weeks, months, quarters, and the like. As another example, an aggregation performed on business information may be adjusted to take into account bank holidays.

At step 506, the method applies the appropriate operation or series of operations necessary to effect the specified analysis. In this manner, the method derives a new (temporary) data set. According to the present invention, this new data set per se is not important to the user; instead, the set serves as a vehicle for constructing the desired analysis. Thus, the derived data set represents temporary or meta-data, which is preferably not retained at the conclusion of the method. Instead, the data is employed to construct the analytical graph for the analysis.

Continuing on to step 507, the analytical graph is constructed by plotting the data points of the temporary set, after which the set is discarded. In a preferred embodiment, the meta-data set is only maintained in the background (i.e., not on the active spreadsheet) so that the user is effectively shielded from this added complexity. In this fashion, the user receives what he or she really wants: an analytical graph, which serves as a visual tool for understanding his or her information. If desired, however, the system provides an option for saving the meta-data set in the spreadsheet, as indicated by step 508. This step corresponds to the Table operation illustrated in FIG. 3G.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the following claims.

What is claimed is:

1. A method, performed by a computer system, for automatically interpreting data stored in an electronic spreadsheet, comprising the steps of:

determining a set of information members to be analyzed in response to input from a user, the set of information members including at least some information members characterized by numeric values;

displaying a number of analysis types for the user;

determining a selected analysis type in response to input from the user;

subjecting the set of information members to a set of operations that effects the selected analysis type so as to generate a temporary data set that includes numeric values based on at least some of the numeric values that characterize the set of information members; and generating a graph representing the temporary data set.

2. The method of claim 1, and further comprising the step of displaying the graph on a display device.

3. The method of claim 1, and further comprising the step of printing the graph.

4. The method of claim 1, and further comprising the step, performed after said step of generating a graph, of discarding the temporary data set without storing the temporary data set in the electronic spreadsheet.

5. The method of claim 1, and further comprising the step, performed after said step of subjecting, of storing the temporary data set in the electronic spreadsheet in response to a user command.

6. The method of claim 1, and further comprising the steps, performed before said step of displaying a number of analysis types, of:

analyzing at least one property of the information members in the set; and selecting analysis types for display on the basis of the at least one property.

7. The method of claim 1 wherein the information members are stored as information cells in a memory device.

8. The method of claim 7 wherein the selected range of cells are stored contiguously in the memory device.

9. The method of claim 1 wherein each of the information members has a data type.

10. The method of claim 9 wherein the data type includes a numeric format selected from one of the following data types: fixed, scientific, currency, percent, date, time, text, and user-defined.

11. The method of claim 9, and further including the steps, performed before said step of displaying a number of analysis types, of:

examining the set of information members for determining a common data type; and determining which ones of available analysis types are appropriate for the determined data type;

wherein said step of displaying a number of analysis types is limited to displaying only ones determined to be appropriate are displayed.

12. The method of claim 11 wherein said step of examining includes heuristically determining a common data type by examining each of the information members with an expert system.

13. The method of claim 11 wherein the displayed analysis types include aggregation, moving average, linear fit, and exponential fit.

14. A method, performed by a computer system, for automatically interpreting data stored in an electronic spreadsheet, comprising the steps of:

determining a set of information members to be analyzed in response to input from a user, the set of information members including at least some information members characterized by numeric values;

analyzing at least one property of the information members in the set;

on the basis of said analyzing step, determining a number of possible analysis types suitable for use with information members having the at least one property;

displaying the number of analysis types for the user;

determining a selected analysis type in response to input from the user;

subjecting the set of information members to a set of operations that effects the selected analysis type so as to generate a temporary data set that includes numeric values based on at least some of the numeric values that characterize the set of information members; and generating a graph representing the temporary data set.

15. The method of claim 14, and further comprising the step, performed after said step of generating a graph, of discarding the temporary data set without storing the temporary data set in the electronic spreadsheet.

16. The method of claim 14, and further comprising the step, performed after said step of subjecting, of storing the temporary data set in the electronic spreadsheet in response to a user command.

17. The method of claim 14 wherein the information members are stored as information cells in a memory device.

18. The method of claim 17 wherein the selected range of cells are stored contiguously in the memory device.

19. The method of claim 18 wherein each of the information members has a data type.

20. The method of claim 19 wherein the data type includes a numeric format selected from one of the following data types: fixed, scientific, currency, percent, date, time, text, and user-defined.

21. The method of claim 19, and further including the steps, performed before said step of displaying a number of analysis types, of:

examining the set of information members for determining a common data type; and determining which ones of available analysis types are appropriate for the determined data type;

wherein said step of displaying a number of analysis types is limited to displaying only ones determined to be appropriate are displayed.

22. The method of claim 21 wherein said step of examining includes heuristically determining a common data type by examining each of the information members with an expert system.

23. The method of claim 14 wherein the displayed list of analyses includes aggregation, moving average, linear fit, and exponential fit.

* * * * *